April 12, 1949.  W. B. WESTCOTT, JR  2,467,064
RETRACTABLE NOSE WHEEL
Filed April 24, 1943  3 Sheets-Sheet 1
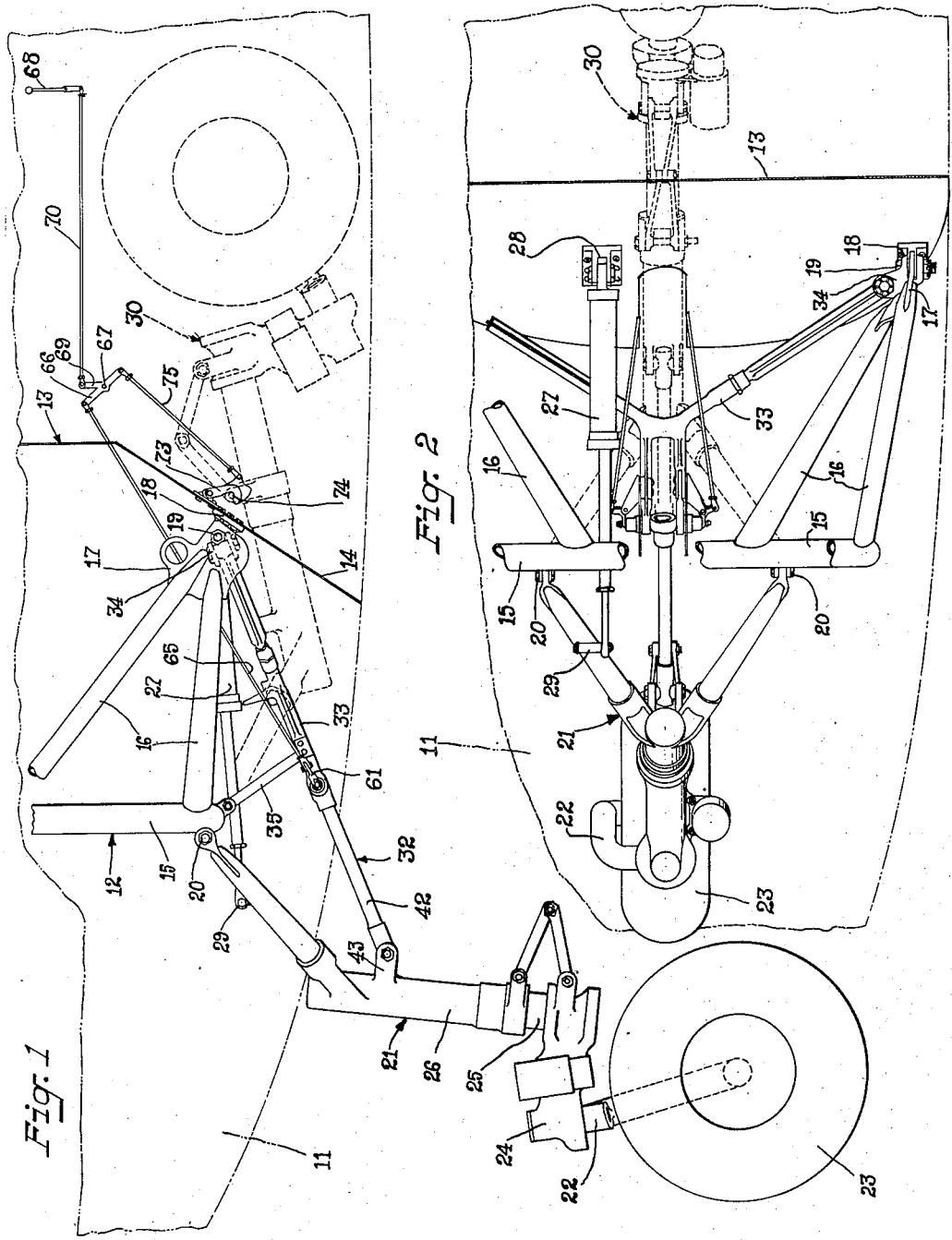
INVENTOR
WILLIAM B. WESTCOTT JR.
BY 
ATTORNEY April 12, 1949.  W. B. WESTCOTT, JR  2,467,064
RETRACTABLE NOSE WHEEL
Filed April 24, 1943  3 Sheets-Sheet 2
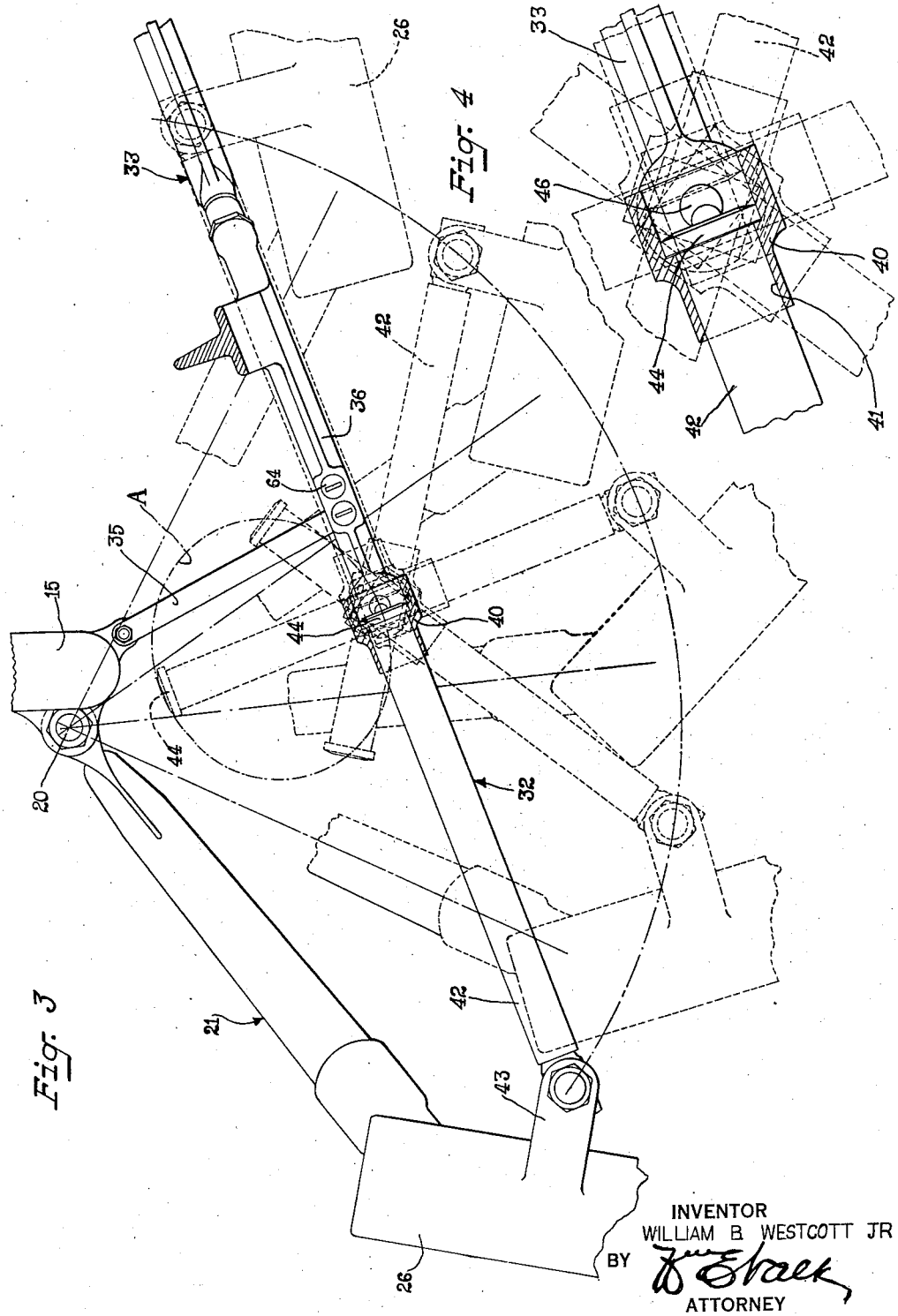
INVENTOR
WILLIAM B. WESTCOTT JR
BY
ATTORNEY April 12, 1949. W. B. WESTCOTT, JR 2,467,064
RETRACTABLE NOSE WHEEL
Filed April 24, 1943 3 Sheets-Sheet 3
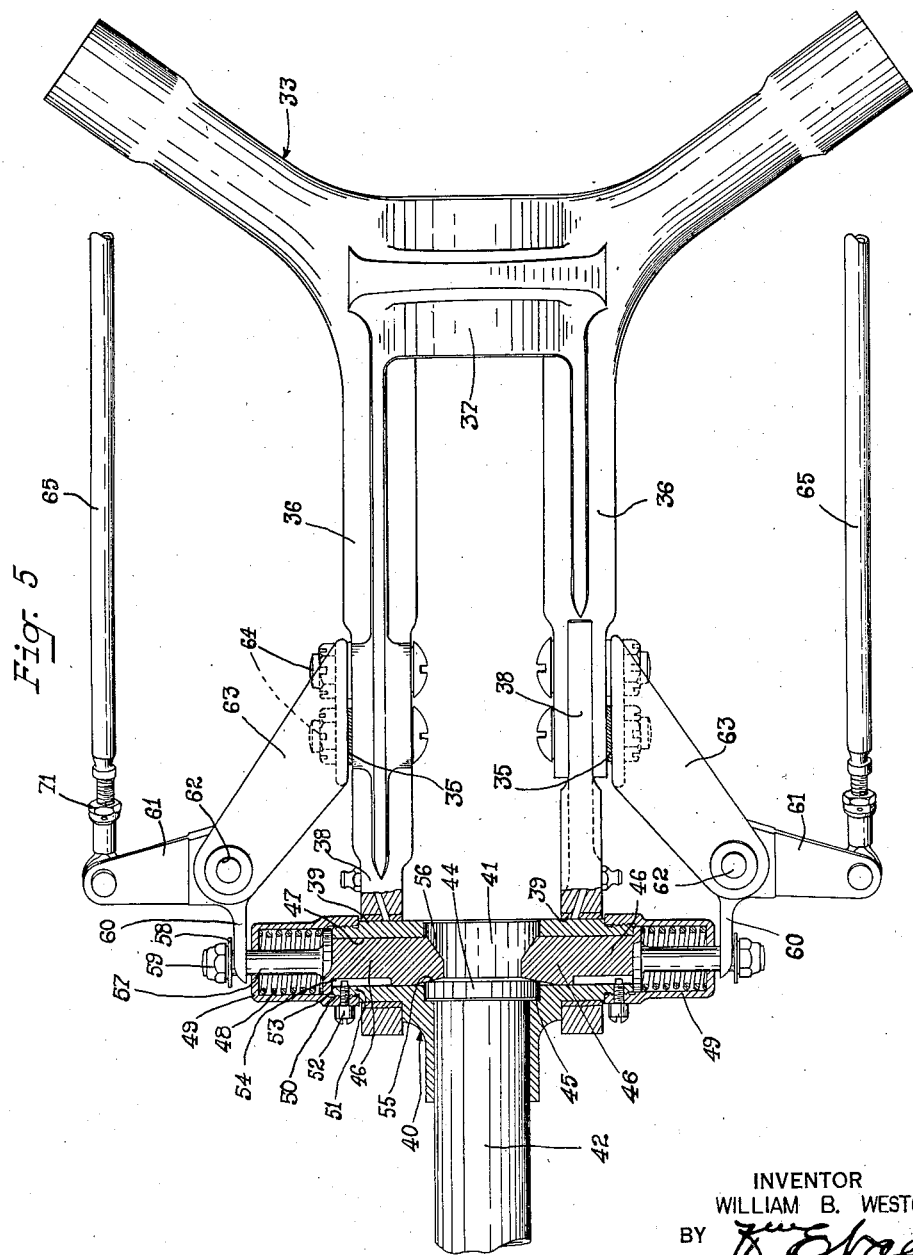
INVENTOR
WILLIAM B. WESTCOTT JR.
BY
ATTORNEY Patented Apr. 12, 1949

2,467,064

UNITED STATES PATENT OFFICE 2,467,064

RETRACTABLE NOSE WHEEL

William B. Westcott, Jr., Columbus, Ohio, assignor to Curtiss-Wright Corporation, a corporation of Delaware Application April 24, 1943, Serial No. 484,448

15 Claims. (Cl. 244—102)

This invention relates to retractable landing gear and more particularly to collapsible struts used in connection therewith.

The usual collapsible strut is not adaptable for use in airplanes providing only limited head space for the withdrawal of the landing gear into the airplane, as for instance, where it is used with landing gear adapted to be mounted in the nose of the airplane fuselage. Such struts are collapsible but are more often in use where there is considerable head space offered within the airplane and within which to project the same. It is, therefore, the object of the present invention to provide a collapsible strut for use with landing gear wherein the members forming a part of the collapsible strut, through their motion, upon the landing gear being retracted, will fold and occupy only minimum space.

It is a more specific object of the invention to provide a retractable landing gear particularly adapted for connection to the engine mounting of an airplane wherein the same may be folded into a position under the engine mounting and without the members of the strut entering or projecting into the confines of the mounting.

According to the present invention, the collapsible strut has been made of two members, one which carries a pivotable trunnion with an opening therein through which the other of the members of the collapsible strut is slidable. The other member, upon the strut being collapsed, will slide through the opening of the trunnion and will fold back under the member containing the trunnion without the trunnion or the member moving vertically. The member containing the trunnion has a bifurcated portion with bearings thereon in which the trunnion is pivoted and between legs thereof the slidable member of the strut can project and pivot. This bifurcated member is connected at its forward end by means of a strap to the engine mounting ring and at its rearward end to the engine mounting at the point of its connection with the fire wall; hence the bifurcated member forming a part of the collapsible strut remains fixed at all times; the movement of the other member with respect thereto being permitted by the sliding connection of the one member with the trunnion and the pivotal movement of the trunnion itself. Associated with the trunnion is a pair of locking elements respectively axially disposed in openings in opposite ends of the same and adapted to extend into the opening through the trunnion for locking engagement with the member which is slidable therethrough, whereby the members can be locked in their extended position. The trunnion is retained in bearing members respectively carried on the legs of the bifurcated member and separable therefrom to permit the assembly of the trunnion thereto. Common means accessible to the pilot is provided for unlocking the collapsible members and for unlocking the landing gear from its raised position to permit the same to be lowered.

For other objects and for a better understanding of the invention, reference may be had to the following detailed description taken in connection with the accompanying drawing, in which Fig. 1 is a phantom view, in elevation, of a part of an airplane structure and of the engine mounting to which is connected the landing gear embodying the collapsible strut of the present invention.

Fig. 2 is a fragmentary plan view of the arrangement shown in Fig. 1.

Fig. 3 is an enlarged fragmentary view, in elevation, of the collapsible strut and illustrating by means of dotted lines, different positions of the strut at different stages of movement of the same as it is folded rearwardly to permit the raising of the landing gear.

Fig. 4 is still another enlarged view, in elevation, taken only at the pivotal joint of the collapsible members and similar to the showing of that portion of the same in Fig. 3.

Fig. 5 is an enlarged plan view of the bifurcated member with the trunnion and the locking means associated therewith being in section and in such position as to retain the slidable member of the collapsible strut in its extended or locked position.

Referring now particularly to Figs. 1 and 2, there is shown a phantom view of the nose of an airplane extending from a point well forward of an engine mounting 12 and to a point rearwardly of a fire wall 13 having a downwardly inclined portion 14. The engine mounting 12 has a usual ring 15 into which the engine is projected and secured, and which is carried on rearwardly extending brace rods, each of the latter being secured at its rearward end to a connecting plate member 17 which is adapted to be attached to a bracket 18 on the fire wall by a fastening bolt 19.

To the ring 15 there is pivotally connected at 20, a shock-absorbing strut 21 which has at its lower end a spindle 22 with a landing wheel 23 thereon. This spindle 22 can caster in a block 24 carried on the end of a member 25 which is slidable in and out of a fluid cylinder 26. This strut 21 is actuated to and from its lowered position by means of a fluid actuator or oleo strut 27 connected to the fire wall 13 by a bracket structure 28 and to a lug 29 on the shock-absorbing strut 21 below its pivot point 20. As the fluid actuator or oleo strut 29 is actuated, pivotal movement of the shock-absorbing strut 21 about the pivot point 20 is effected. An extension of the oleo strut 27 will move the strut 21 to its operative or down position so that its wheel 23 will be in contact with the ground upon the airplane making its landing and upon the oleo strut 27 being retracted after the take-off of the airplane, the strut 21 will be drawn into the body structure 11 of the airplane to assume its retracted position, shown in dotted lines 30 in Figs. 1 and 2.

As a means for locking the shock-absorbing strut 21 in its down position, there is provided a collapsible strut 32 embodying the features of the present invention. This strut 32 includes a stationary member 33 connected to laterally extending brackets 34 on the connecting plates 17 and to the ring 15 by means of downwardly extended straps 35. These straps 35 connect with legs 36 of a bifurcated portion 37 to the forward ends of which is respectively connected bearing elements 38 between which there is provided a space. On the outer end of the bearing elements 38 there is respectively provided bearing openings 39 into which there is extended for rotational movement a trunnion 40 which has an opening 41 extending therethrough. This opening 41 is adapted to receive a tubular brace member 42 in a manner such as to permit it to slide therethrough. The member 42 at is lower end is connected to a lug 43 on the cylinder 26 of the shock absorbing strut.

The member 42 at its connecting end with the trunnion 40 has an enlarged head 44 adapted to abut against a shoulder 45 in the trunnion when the member 42 is extended from the member 33 as when the shock-absorbing strut 21 is in its lowered position. As the strut 21 is retracted, the member 42 is slid rearwardly through the trunnion 40 into the space between the legs 36 of the bifurcated portion 37 of the member 33. At the same time that this sliding movement has taken place, the trunnion is rotated in the bearing openings 39 so as to permit the folding of the member 42 up under the member 33, the head 44 of the member 42 describing something of an ellipse A, Fig. 3.

This sliding of the member 42 through the trunnion and the consequent rotation of the trunnion 42 is permitted only as locking elements 46 in openings 47 of the trunnion are withdrawn so as to release the head 44 for movement away from the shoulder 45. These locking elements 46 are axially slidable in axially extended openings 47 and are normally held projected into the opening 41 by compression springs 48 in cup-shaped retainers 49. The cup-shaped retainer is internally threaded at 50 and is held against being unthreaded from the threaded portion ends 51 of the trunnion 40 by a fastening screw 52 which extends through the end 51 and into the wall axial opening 47. By so doing the screw 52 also serves to prevent rotation of the locking element by keying with an axially extending slot 54 in the locking element 46. On the inner ends of the locking members, there is provided a face portion 55 adapted to contact with an inclined face on the head 44 of the pipe 42. On the other side of the locking element 46 is a face portion 56 having less inclination than the surface 55 and serving as a means for the contact of the head member 44 as it is returned forwardly through the trunnion 40.

These locking elements 46 have a stem 57 which extends through the cup retainer 49 and on the outer end of which is disposed a washer 58 and a nut 59. Under the washer 58 there is projected an arm 60 of a bell crank 61 which is pivoted at 62 on a laterally extending bracket 63 which is connected to the bifurcated portion 37 by fastening bolts 64. One of each pair of the latter serves as the means for the connection of a bracing strap 35 with the member 33 while one of said pairs serves for the connecting of one of the bearing elements 38 with one of the legs 36. The bell crank 61 is adapted to be actuated by the rearwardly extending connecting rods 65 which are connected to a lever 66 pivotable with respect to the aicraft structure about a pivot 67 and adapted to be operated by a hand lever 68 in the cockpit of the airplane and which is connected to an arm 69 of the lever 66 by a rod 70. The rod 65 may be adjusted in length by a screw adjustment 71 on the forward end near its connection with bell crank 61.

In order to lock the landing gear structure in its raised position, there is provided on the inclined portion of the fire wall 13 a pivot hook 73 adapted to hook under a lateral projection 74 on the shock-absorbing strut 21. This hook 74 is operated by the same lever 66 that is utilized for the lock system associated with the collapsible strut, the former being connected with this lever 66 by a connecting link 75. With the hand lever 68 moved to one position or the other, either the collapsible strut will be locked to hold the landing gear in its down position or the landing gear will be locked to the fire wall 13 to hold the same in its raised position.

It should now be apparent that there has been provided a collapsible strut for landing gear wherein only minimum space is required for the collapsing of the strut as the shock-absorbing strut is pivoted rearwardly to its raised position. The head 44 of the member 42 will project only a small distance upwardly as the strut is collapsed and outside of the confines of the engine mounting. It should also be apparent that there has been provided a novel arrangement which is associated with the trunnion itself for effecting the locking of the collapsible strut in its extended position.

While various changes may be made in the detail construction, it shall be understood that such changes shall be within the spirit and scope of the present invention as defined by the appended claims.

I claim as my invention:

1. In an airplane, a structure adapted for movement into and out of its operative position, a collapsible strut for retaining the movable structure in its operative position including two interconnected members, one of said members having a bifurcated portion, a trunnion rotatably connected to the bifurcated portion and with an opening therein in alignment with a space defined by the bifurcated portion, the other of said members being slidable through the trunnion opening and into the space defined by the bifurcated portion upon structure being moved, locking elements respectively axially movable in opposite ends of the trunnion and adapted to project into the opening therethrough for locking engagement with the other member to thereby effect locking together of the two members when extended with respect to each other, and means carried on the bifurcated member for operating the locking elements.

2. In an airplane, a main strut which carries a surface-engaging element and which is pivotally mounted for swinging movement to extended and retracted positions, a collapsible strut for holding the main strut in its extended position, said collapsible strut having stationary and movable sections, means pivoted upon a fixed axis to the stationary section and slidably connecting the movable section for pivotally and slidably connecting the movable section to the stationary section so that, as the main strut is extended and retracted, the movable section of the collapsible strut may move lengthwise and swing about its connection with the stationary section in the same sense in which the main strut swings about its pivotal mounting, and means for locking the movable and stationary sections of the collapsible strut against relative movement in the extended position of the main strut.

3. In an airplane, a main strut which carries a surface-engaging element and which is pivotally mounted for movement to extended and retracted positions, a collapsible strut for holding the main strut in its extended position, said collapsible strut having stationary and movable sections, means pivoted upon a fixed axis to the stationary section and slidably connecting the movable section for pivotally and slidably connecting the movable section to the stationary section so that, as the main strut is extended and retracted, the movable section of the collapsible strut may move lengthwise and swing about its connection with the stationary section in the same sense in which the main strut swings about its pivotal mounting, said collapsible strut sections assuming a substantially rectilinear relation in the extended position of the main strut, and means for locking the movable and stationary sections of the collapsible strut against relative movement in the extended position of the main strut.

4. In an airplane, a main strut which carries a surface-engaging element and which is pivotally mounted for movement to extended and retracted positions, a collapsible strut for holding the main strut in its extended position, said collapsible strut having stationary and movable sections, a swivel carried by the outer end of the stationary strut section for movement with respect thereto and for slidable engagement with the inner end of the movable section, said swivel permitting the movable section to move lengthwise and to swing in the same sense in which the main strut swings about its pivotal mounting, and means for locking the movable and stationary sections of the collapsible strut against relative movement in the extended position of the main strut.

5. In an airplane, a main strut which carries a surface-engaging element and which is pivotally mounted for movement to extended and retracted positions, a collapsible strut for holding the main strut in its extended position, said collapsible strut having stationary and movable sections, a swivel carried by the outer end of the stationary strut sections for movement with respect thereto and for slidable engagement with the inner end of the movable section, said swivel permitting the movable section to move lengthwise and to swing in the same sense in which the main strut swings about is pivotal mounting, said collapsible strut sections assuming a substantially rectilinear relation in the extended position of the main strut, and means for locking the movable and stationary sections of the collapsible strut against relative movement in the extended position of the main strut.

6. In an airplane, a main strut which carries a surface-engaging element and which is pivotally mounted for movement to extended and retracted positions, a collapsible strut for holding the main strut in its extended position, said collapsible strut having a stationary section formed with fork extensions and a movable section, a swivel having journals mounted in said fork extensions and being formed with a transverse bore for accommodating and movable section, said swivel permitting the movable section to move lengthwise in said bore and to swing in the same sense in which the main strut swings about its pivotal mounting, and means for locking the movable and stationary sections of the collapsible strut against relative movement in the extended position of the main strut.

7. In an airplane, a main strut which carries a surface-engaging element and which is pivotally mounted for movement to extended and retracted positions, a collapsible strut for holding the main strut in its extended position, said collapsible strut having a stationary section formed with fork extensions and a movable section, a swivel having journals mounted in said fork extensions and being formed with a bore for accommodating said movable section, said swivel permitting the movable section to move lengthwise in said bore and to swing in the same sense in which the main strut swings about its pivotal mounting, said collapsible strut sections assuming a substantially rectilinear relation in the extended position of the main strut, and means for locking the movable and stationary sections of the collapsible strut against relative movement in the extended position of the main strut.

8. In an airplane, a main strut which carries a surface-engaging element and which is pivotally mounted for movement to extended and retracted positions, a collapsible strut for holding the main strut in its extended position, said collapsible strut having a stationary section formed with fork extensions and a movable section formed with a head, a swivel having journals mounted in said fork extensions, being formed with a transverse bore between said journals for accommodating said movable section and having a seat for said head, said swivel permitting the movable section to move lengthwise between said fork extensions and to swing in the same sense in which the main strut swings about its pivotal mounting, and means for holding said head against said seat in the extended position of the main strut.

9. In an airplane, a main strut which carries a surface-engaging element and which is pivotally mounted for movement to extended and retracted positions, a collapsible strut for holding the main strut in its extended position, said collapsible strut having a stationary section formed with fork extensions and a movable section formed with a head, a swivel having journals mounted in said fork extensions, being formed with a transverse bore between said journals for accommodating said movable section and having a seat for said head, said swivel permitting the movable section to move lengthwise between said fork extensions and to swing in the same sense in which the main strut swings about its pivotal mounting, and opposed locking elements which are engageable with said head for holding the latter against said seat in the extended position of the main strut, said locking elements being retractable to permit said head to pass between them when the main strut is retracted.

10. In an airplane, a main strut which carries a surface-engaging element and which is pivotally mounted for movement to extended and retracted positions, a collapsible strut for holding the main strut in its extended position, said collapsible strut having a stationary section formed with fork extensions and a movable section formed with a head, a swivel having journals mounted in said fork extensions, being formed with a transverse bore between said journals for accommodating said movable section, having a seat for said head and permitting the movable section to move lengthwise between said fork extensions and to swing in the same sense in which the main strut swings abouts its pivotal mounting, said collapsible strut sections assuming a substantially rectilinear relation in the extended position of the main strut, opposed locking elements which are engageable with said head for holding the latter against said seat in the extended position of the main strut, said locking elements having beveled faces which exercise a wedging action upon said head, resilient means for biasing said elements toward a locking position, and means for withdrawing said locking elements to permit said head to pass between them when the main strut is retracted.

11. The combination with the engine mount of an airplane, of a main strut which carries a surface-engaging element and which is pivotally connected to said engine mount for movement to extended and retracted positions, a collapsible strut for holding said main strut in its extended position, said collapsible strut having stationary and movable sections, means pivoted upon a fixed axis to the stationary section and slidably connecting the movable section for pivotally and slidably connecting the movable section to the stationary section so that, as the main strut is extended and retracted, the movable section of the collapsible strut may move lengthwise and swing about its connection with the stationary section in the same sense in which the main strut swings about its pivotal connection with said engine mount, and means for locking the movable and stationary sections of the collapsible strut against relative movement in the extended position of the main strut.

12. The combination with the engine mount of an airplane, of a main strut which carries a surface-engaging element, said strut having angularly-extending, diverging arms which are pivotally connected to the engine mount so that said strut may be moved to an extended position in which said surface-engaging element is lowered and located ahead of the engine mount and to a retracted position in which it is elevated and located behind the engine mount, a collapsible strut for holding said main strut in its extended position, said collapsible strut having stationary and movable sections, means for pivotally and slidably connecting the movable section to the stationary section so that as the main strut is extended and retracted, the movable section of the collapsible strut may move lengthwise and swing about its connection with the stationary section in the same sense in which the main strut swings about its pivotal connections with said engine mount, and means for locking the movable and stationary sections of the collapsible strut against relative movement in the extended position of the main strut.

13. The combination with the engine mount of an airplane, of a main strut which carries a surface-engaging element, said strut having angularly-extending, diverging arms which are pivotally connected to the engine mount so that said strut may be moved to an extended position in which said surface-engaging element is lowered and located ahead of the engine mount and to a retracted position in which it is elevated and located behind the engine mount, a collapsible strut for holding said main strut in its extended position, said collapsible strut having stationary and movable sections, means for connecting the stationary section to, and for supporting it below, said engine mount, means for pivotally and slidably connecting the movable section to the stationary section so that, as the main strut is extended and retracted, the movable section of the collapsible strut may move lengthwise and swing about its connection with the stationary section in the same sense in which the main strut swings about its pivotal connections with said engine mount, said collapsible strut sections assuming a substantially rectilinear relation in the extended position of the main strut, and means for locking the movable and stationary sections of the collapsible strut against relative movement in the extended position of the main strut.

14. The combination with the engine mount of an airplane, of a main strut which carries a surface-engaging element, said strut having angularly-extending, diverging arms which are pivotally connected to the engine mount so that said strut may be moved to an extended position in which said surface-engaging element is lowered and located ahead of the engine mount and to a retracted position in which it is elevated and located behind the engine mount, a collapsible strut for holding said main strut in its extended position, said collapsible strut having a stationary section formed with fork extensions and a movable section, means for connecting the stationary section to, and for supporting it below, said engine mount, a swivel having journals mounted in said fork extensions and being formed with a bore between said journals for accommodating said movable section, whereby, as the main strut is extended and retracted, the movable section of the collapsible strut may move lengthwise in said bore and swing in the same sense in which the main strut swings about its pivotal connections with said engine mount, said collapsble strut sections assuming a substantially rectilinear relation in the extended position of the main strut, and means for locking the movable and stationary sections of the collapsible strut against relative movement in the extended position of the main strut.

15. In an airplane, a landing gear shock strut comprising telescoping inner and outer sections, the inner section having a pivot connection to the aircraft for swinging of the shock strut between extended and retracted positions, the outer section carrying a surface-engaging element, a member pivoted to the aircraft on an axis substantially parallel to the axis of said pivot connection, a brace strut pivoted to said inner section of the shock strut and slidably connected with said pivoted member, and latch means for holding the brace strut against sliding movement relative to the pivoted member in at least one of said positions of the shock strut.

WILLIAM B. WESTCOTT, JR.

(References on following page)

REFERENCES CITED

The following references are of record in the file of this patent:

UNITED STATES PATENTS

| Number | Name | Date |
|---|---|---|
| 1,553,249 | Legrain | Sept. 8, 1925 |
| 1,812,211 | McCrea | June 30, 1931 |
| 2,180,462 | De Seversky | Nov. 21, 1939 |

FOREIGN PATENTS

| Number | Country | Date |
|---|---|---|
| 17,291 | Great Britain | 1909 |
| 518,020 | Great Britain | Feb. 15, 1940 |